US008814556B2

United States Patent
Hirai et al.

(10) Patent No.: US 8,814,556 B2
(45) Date of Patent: Aug. 26, 2014

(54) METHOD AND DEVICE FOR MANUFACTURING SHEET HAVING FINE SHAPE TRANSFERRED THEREON

(75) Inventors: Yuma Hirai, Shiga (JP); Kiyoshi Minoura, Shiga (JP); Fumiyasu Nomura, Shiga (JP)

(73) Assignee: Toray Industries, Inc, Tokyo (JP)

( * ) Notice: Subject to any disclaimer, the term of this patent is extended or adjusted under 35 U.S.C. 154(b) by 94 days.

(21) Appl. No.: 12/677,265

(22) PCT Filed: Sep. 22, 2008

(86) PCT No.: PCT/JP2008/067053
§ 371 (c)(1),
(2), (4) Date: May 26, 2010

(87) PCT Pub. No.: WO2009/041373
PCT Pub. Date: Apr. 2, 2009

(65) Prior Publication Data
US 2010/0289182 A1 Nov. 18, 2010

(30) Foreign Application Priority Data

Sep. 28, 2007 (JP) .................................. 2007-253727
Mar. 31, 2008 (JP) .................................. 2008-089929

(51) Int. Cl.
*B29C 59/02* (2006.01)

(52) U.S. Cl.
USPC ........... 425/385; 425/394; 425/396; 425/398; 425/416; 425/369; 264/293; 264/321

(58) Field of Classification Search
CPC .... B30B 15/06; B30B 15/061; B30B 15/065; B30B 15/067
USPC ......... 425/385, 363, 369, 383, 394, 396, 398, 425/416, 419; 264/293, 107, 319, 321
See application file for complete search history.

(56) References Cited

U.S. PATENT DOCUMENTS 4,212,839 A * 7/1980 Funahashi ..................... 264/45.3
4,312,823 A * 1/1982 Kraakman et al. ............. 264/107
(Continued)

FOREIGN PATENT DOCUMENTS

| JP | 60154115 U1 | 10/1985 | |
| JP | 02-305612 | * 12/1990 | ............. B29C 43/18 |

(Continued)

OTHER PUBLICATIONS

International Search Report in related application PCT/JP2008/067053 mailed Nov. 11, 2008.

*Primary Examiner* — Seyed Masoud Malekzadeh
(74) *Attorney, Agent, or Firm* — Pillsbury Winthrop Shaw Pittman, LLP

(57) ABSTRACT

A method for manufacturing a sheet having a shape transferred thereon, in which a sheet-like base made of a thermoplastic resin is placed between an imprint mold and an intermediate base and the sheet-like base is then pressed by a pair of pressing plates to imprint the shape of surface irregularity of the imprint mold to the sheet-like base. The sheet-like base is pressed such that, when pressing force of the pressing plates is maximum, an imprinting pressure difference is present in an imprinting surface of the imprint mold, a maximum imprinting pressure section is present in the imprinting surface, and a portion where the imprinting pressure is minimum is not present in the imprinting surface. The method achieves uniform and highly accurate shape transfer without trapping of air.

6 Claims, 5 Drawing Sheets

(56) References Cited

U.S. PATENT DOCUMENTS

| | | | | |
|---|---|---|---|---|
| 4,349,499 A * | 9/1982 | Johnston | .................. | 264/107 |
| 4,395,211 A * | 7/1983 | Broeksema et al. | ....... | 425/174.4 |
| 4,521,175 A * | 6/1985 | Medwed | .................. | 425/403 |
| 4,724,222 A * | 2/1988 | Feldman | .................. | 250/492.2 |
| 4,887,282 A * | 12/1989 | Mueller | .................. | 378/34 |
| 5,262,181 A * | 11/1993 | Torterotot | .................. | 425/387.1 |
| 5,427,599 A * | 6/1995 | Greschner et al. | .............. | 65/305 |
| 5,512,131 A * | 4/1996 | Kumar et al. | .................. | 438/738 |
| 5,675,403 A * | 10/1997 | Cerrina et al. | .................. | 355/75 |
| 5,737,064 A * | 4/1998 | Inoue et al. | .................. | 355/73 |
| 5,804,089 A * | 9/1998 | Suzuki et al. | .................. | 216/71 |
| 5,932,045 A * | 8/1999 | Campbell et al. | .............. | 156/102 |
| 5,984,656 A * | 11/1999 | Kittel et al. | .................. | 425/125 |
| 6,030,275 A * | 2/2000 | Lofaro | .................. | 451/5 |
| 6,274,076 B1 * | 8/2001 | Kittel et al. | .................. | 264/266 |
| 6,355,198 B1 * | 3/2002 | Kim et al. | .................. | 264/259 |
| 6,592,434 B1 * | 7/2003 | Vanell et al. | .................. | 451/41 |
| 6,869,548 B2 * | 3/2005 | Matsumoto | .................. | 264/1.36 |
| 7,331,283 B2 * | 2/2008 | Sewelll | .................. | 101/3.1 |
| 7,363,854 B2 * | 4/2008 | Sewell | .................. | 101/41 |
| 7,409,759 B2 * | 8/2008 | Sewell | .................. | 29/603.01 |
| 7,410,591 B2 * | 8/2008 | Sewell | .................. | 216/24 |
| 7,635,263 B2 * | 12/2009 | Cherala et al. | .................. | 425/385 |
| 7,641,840 B2 * | 1/2010 | Choi et al. | .................. | 264/299 |
| 7,701,668 B2 * | 4/2010 | Sewell | .................. | 360/135 |
| 8,109,751 B2 * | 2/2012 | Ando et al. | .................. | 425/385 |
| 8,163,222 B2 * | 4/2012 | Done et al. | .................. | 264/293 |
| 2002/0063350 A1 * | 5/2002 | Matsumoto | .................. | 264/1.36 |
| 2004/0036850 A1 * | 2/2004 | Tsukamoto et al. | .......... | 355/72 |
| 2004/0191700 A1 * | 9/2004 | Kuwabara et al. | ............ | 430/320 |
| 2004/0197712 A1 * | 10/2004 | Jacobson et al. | ............. | 430/322 |
| 2004/0200368 A1 * | 10/2004 | Ogino et al. | .................. | 101/34 |
| 2006/0172031 A1 * | 8/2006 | Babbs et al. | .................. | 425/385 |
| 2006/0172549 A1 * | 8/2006 | Choi et al. | .................. | 438/758 |
| 2006/0172553 A1 * | 8/2006 | Choi et al. | .................. | 438/780 |
| 2007/0114686 A1 * | 5/2007 | Choi et al. | .................. | 264/2.7 |
| 2007/0126150 A1 * | 6/2007 | GanapathiSubramanian et al. | .......... | 264/319 |
| 2008/0220218 A1 * | 9/2008 | Wu et al. | .................. | 428/187 |

FOREIGN PATENT DOCUMENTS

| | | |
|---|---|---|
| JP | 2004288845 A | 10/2004 |
| JP | 2006059405 A | 3/2006 |
| JP | 2006303292 A | 11/2006 |
| JP | 2007190735 A | 8/2007 |
| JP | 2007245579 A | 9/2007 |
| JP | 2008012844 A | 1/2008 |

* cited by examiner

METHOD AND DEVICE FOR MANUFACTURING SHEET HAVING FINE SHAPE TRANSFERRED THEREON

CROSS REFERENCE TO RELATED APPLICATIONS

This application is a U.S. National phase of International Application No. PCT/JP2008/067053, filed Sep. 22, 2008, which in turn claims priority to Japanese Patent Application No. 2007-253727, filed on Sep. 28, 2007 and Japanese Patent Application No. 2008-089929, filed on Mar. 31, 2008. The contents of each of which are incorporated herein by reference in their entirety.

TECHNICAL FIELD

The present invention relates to a method and device for manufacturing a sheet to which a fine shape is transferred so that a fine three-dimensional shape is formed on one surface or each of the two surfaces.

BACKGROUND ART

As a method for forming a three-dimensional shape such as fine texture at least on one surface of a resin sheet or the like, such a method has been known in which a heating plate is heated by joule heat, and an imprint mold is placed between the heating plate and a material, and by pressing these by using a pair of pressing plates, a three-dimensional shape with three-dimensional texture is transferred onto the material (Patent Document 1). In this device, however, it is very difficult to produce the heating plate, imprint mold and material with completely uniform thicknesses, with the result that unevenness in thickness is considered to be present. Consequently, problems are raised in which, due to forming pressure unevenness caused by this unevenness in thickness, it is not possible to obtain uniform formed products.

In order to prevent this forming pressure unevenness, a method has been known in which an elastic member is installed between the heating plate and the imprint mold so that the unevenness in thickness is absorbed (Patent Document 2). In this method, however, since the imprint mold is heated through the elastic member, much time is required for the heating process to cause degradation of the productivity.

Moreover, in both of Patent Document 1 and Patent Document 2, in order to prevent defects due to air trapping, an arrangement is made so that the resin sheet and the forming device are placed in a reduced-pressure chamber, and after reducing the pressure in the reduced-pressure chamber, the forming process is started. However, much time is required for the pressure-reducing process, and in particular, in the case of the material having a large area, the volume of the reduced-pressure chamber needs to be enlarged, resulting in a problem of serious degradation of the productivity.

Another method for preventing air trapping has been known in which, when a transfer plate and a resin plate start being made in contact with each other, the transfer plate is bent by a holding member utilizing springs having different repulsive forces so as to protrude toward the resin plate so that a forming process is carried out while air is being removed from the vicinity of the center of the transfer surface (Patent Document 3).
Patent Document 1: JP-A No. 2004-074775
Patent Document 2: JP-A No. 2007-230241
Patent Document 3: JP-A No. 2006-035573

DISCLOSURE OF THE INVENTION

Problems to be Solved by the Invention

In the technique of Patent Document 3, however, the holding member is placed on a non-transfer portion of the transfer plate in an attempt to make the pressure onto the transfer surface uniform at the time when the press pressing force is maximized. In this structure, since the interval between the holding members becomes wider when the transfer surface has a large area, the transfer surface becomes slackened to cause a problem in that air trapping occurs in the slackened portion upon forming. Moreover, since an elastic force difference is provided in the holding member, a pressure distribution is caused on the transfer surface to presumably generate a minimum pressure portion in the interval between the holding members. For this reason, one portion of the trapped air in the slackened portion remains in this minimized pressure portion to cause a problem of transfer defects. Although some of the trapped air is removed upon forming, since no, pressure distribution for positively removing air is prepared on an imprinting surface, it is necessary to carry out the pressing process for a long period of time to remove air, with the result that the cycle time is prolonged to cause degradation of the productivity.

In view of the above-mentioned problems, an object of the present invention is to provide a method and device for manufacturing a sheet having fine shapes transferred thereon used for imprinting the fine shapes of texture of an imprint mold on at least one face of a sheet-like material, in which, without causing transfer defects, trapped air between the imprint mold and the sheet-like material is removed out of the imprinting surface upon forming, even in the case when the imprinting process is carried out at least one face of the sheet-like material with a large area, and a sheet having a surface on which the fine texture are desirably formed, is manufactured with high efficiency.

Means for Solving the Problems (1) In order to achieve the above object, the method for manufacturing a sheet having a fine shape transferred thereon of the present invention is provided with the following method:
A method for manufacturing a sheet having the fine shapes transferred thereon including the steps of: placing a sheet-like material made from a thermoplastic resin between an imprint mold having an imprinting surface provided with the fine shapes of texture and an intermediate base; and pressing the imprint mold and the intermediate base in a direction toward the sheet-like material by a pair of pressing plates so that the fine shapes of texture are imprinted on at least one face of the sheet-like material, wherein the sheet-like material is pressed such that, when pressing force of the pressing plates is maximized, an imprinting pressure difference is present in an imprinting surface of the imprint mold, a maximum imprinting pressure section is present in the imprinting surface, and a portion where the imprinting pressure has a minimum value is not present in the imprinting surface.

(2) Moreover, in order to achieve the above object, an imprint mold of the present invention has the following structure:
An imprint mold, which is a plate-shaped imprint mold for transferring the fine shapes of texture onto a sheet-shaped material, provided with: an imprinting surface provided with the fine shapes of texture, wherein a change in thickness is present in the imprinting surface, a maximum thickness section is present in the imprinting surface, and no minimum value in thickness is present in the imprinting surface.

(3) Moreover, in order to achieve the above object, another imprint mold of the present invention has the following structure:

An imprint mold, which is a plate-shaped imprint mold for transferring the fine shapes of texture onto a sheet-shaped material, provided with: an imprinting surface provided with the fine shapes of texture, wherein the imprint mold is curved as a whole, with the center of curvature of the curved shape being present on the side reversed to the imprinting surface.

(4) In order to achieve the above object, a device for manufacturing a sheet having a fine shape transferred thereon of the present invention has the following structure:

A device for manufacturing a sheet having a fine shape transferred thereon including at least: the imprint mold of the present invention;
an intermediate base;
a pair of pressing plates placed so as to sandwich the imprint mold and the intermediate base from the two sides; and
pressing means for pressing the imprint mold, the intermediate base and the paired pressing plates.

(5) In order to achieve the above object, another device for manufacturing a sheet having a fine shape transferred thereon of the present invention has the following structure:

A device for manufacturing a sheet having a fine shape transferred thereon including at least: an imprint mold having an imprinting surface provided with the fine shapes of texture;
an intermediate base;
a pair of pressing plates placed so as to sandwich the imprint mold and the intermediate base from the two sides;
pressing means for pressing the imprint mold, the intermediate base and the paired pressing plates; and
a convex-shaped plate placed on a surface of at least one of the paired pressing plates on the pressure-applying direction side, and in this structure, the plate has a thickness distribution, a maximum thickness section is present in the imprinting surface, and a portion where the imprinting pressure has a minimum value is not present in the imprinting surface.

Effects of the Invention

In accordance with the method and device for manufacturing a transfer sheet having the fine shapes of texture of the present invention, by utilizing an imprinting pressure difference in an imprinting surface, residual air trapped between the sheet-like material and the imprint mold upon imprinting is excluded out of the imprinting surface so that it is possible to prevent defects due to air trapping and consequently to achieve uniform and highly accurate shape transfer.

In accordance with the imprint mold of the present invention, by curving the imprinting surface of the imprint mold, it is possible to easily obtain a desired imprinting pressure distribution while eliminating defects due to air trapping, and consequently to improve the productivity.

DESCRIPTION OF REFERENCE SYMBOLS

Figure 1:
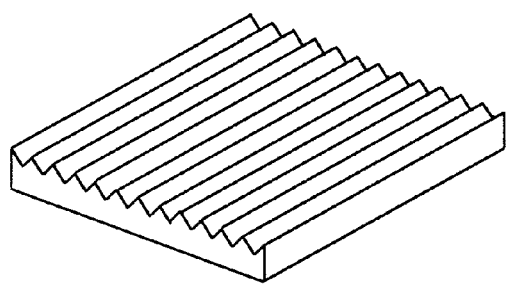
FIG. 1 is a schematic drawing that explains an imprint mold having a fine shape with stripes as a schematic model of one embodiment of an imprint mold in accordance with the present invention.

1: Device for manufacturing a sheet having a fine shape transferred thereon
2: Pressing device
3: upper side pressing plate
4: Intermediate base
41: Member having a cushioning property
42: Transfer sheet
5: Sheet-like base
6: Imprint mold
61: Heating medium passage
62: Imprint mold imprinting surface
63a: heating medium manifold directing to the mold
63b: heating medium manifold returning from the mold
7: Plate
8: Lower side pressing plate
9: Switching valve
10: Heating device
11: Cooling device
P2: Imprinting pressure

BEST MODE FOR CARRYING OUT THE INVENTION

Referring to the drawings and the like, the following description will discuss a method for manufacturing a sheet having a fine shape transferred thereon of the present invention in more detail.

The method for manufacturing a sheet having a fine shape transferred thereon of the present invention is provided with processes in which a sheet-like material made of a thermoplastic resin is placed between an imprint mold having an imprinting surface with the fine shapes of texture and an intermediate base, and by pressing the imprint mold and the intermediate base toward the sheet-like material by using a pair of pressing plates, the fine shapes of texture are imprinted onto the sheet-like material, and in this method, when pressing force of the pressing plates is maximized, an imprinting pressure difference is present in an imprinting surface of the imprint mold, a maximum imprinting pressure section is present in one portion of the imprinting surface, and a portion where the imprinting pressure has a minimum value is not present in the imprinting surface.

Moreover, upon imprinting the fine shapes of textures on both of the surfaces of the sheet-like material, an imprinting surface made of the fine shapes of texture are also formed on the intermediate base so that the surface of the sheet-like material facing the intermediate base can also be imprinted with the fine shapes of texture. In this case also, the arrangement is preferably provided in which, when pressing force of the pressing plates is maximized, an imprinting pressure difference is present in an imprinting surface of the imprint mold, maximum imprinting pressure section is present in one portion of the imprinting surface, and a portion where the imprinting pressure has a minimum value is not present in the imprinting surface.

In this case, the expression "when pressing force is maximized" refers to a point of time at which the pressing force of a press machine that carries out an imprinting process on the sheet-like material by the imprint mold by using a pair of pressing plates is maximized.

Here, "one portion in the imprinting surface" may be not only a one point within the imprinting surface, but also a line portion that is continuously extended.

Figure 2:
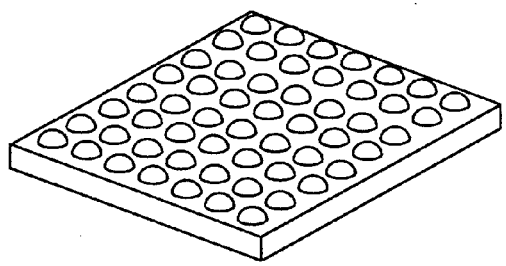
FIG. 2 is a schematic drawing that explains an imprint mold having a fine shape that is two-dimensionally placed as a schematic model of one embodiment of the imprint mold in accordance with the present invention.

Moreover, the expression "fine shape of texture" refers to shapes in which convex shapes having a height from 10 nm to 1 mm are periodically repeated with pitches of 10 nm to 1 mm. More preferably, the shape in which convex shapes having a height from 1 μm to 100 μm are periodically repeated with pitches of 1 μm to 100 μm is used. For example, a structure is proposed in which a plurality of grooves having a triangular shape are extended linearly in parallel with one another in a stripe pattern, as shown in FIG. 1. FIG. 1 shows grooves, each having a triangular shape in its cross section; however, not limited to the triangular shape, a semi-circular shape, a semi-elliptical shape or the like may be used in the present invention. Moreover, the grooves are not necessarily required to be formed linearly, and a curved stripe pattern may be used. The "fine shape of texture" also includes a shape having a two-dimensional pattern, typically represented by an emboss shape as shown in FIG. 2. Although FIG. 2 shows a semi-circular emboss shape for each of the convex shapes, other convex shapes, such as a cone shape and a rectangular parallelepiped shape, may also be used in the present invention.

Moreover, the expression "the imprinting pressure has a minimum value" refers to a state in which, in the case when the imprinting surface is divided into a lattice pattern, with a length of one side being set to 10 mm, supposing that the average imprinting pressure within an arbitrary lattice is P, and that the average imprinting pressure of eight lattices that are made in contact with this lattice are $P_1$ to $P_8$, $P \leq P_x$ holds with respect to all the x's (where x is a natural number from 1 to 8). That is, the expression "a portion where the imprinting pressure has a minimum value is not present in the imprinting surface" refers to the fact that no lattice which allows $P \leq P_x$ to be satisfied with respect to all the x's is present within the imprinting surface. In other words, with respect to all the lattices within the imprinting surface, there is at least one adjacent lattice that satisfies the average imprinting pressure $P_x < P$. Additionally, unless the imprinting pressure distribution measured with intervals, of 10 mm has a minimum value, the object of the present invention is achieved sufficiently.

Figure 3:
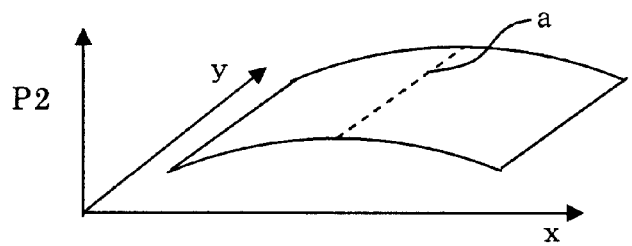
FIG. 3 is a schematic drawing that shows as a schematic model an imprinting pressure distribution having a maximum imprinting pressure on a center line of the x- axis of an imprinted surface, with no minimum value of imprinting pressure within the imprinted surface, of one embodiment of a method for manufacturing a sheet having a fine shape transferred thereon of the present invention.
Figure 4:
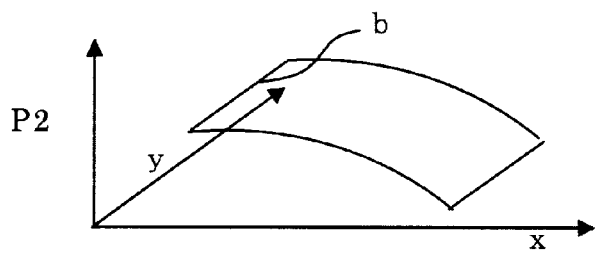
FIG. 4 is a schematic drawing that shows as a schematic model an imprinting pressure distribution having a maximum imprinting pressure on a line of one end portion of the x-axis of the imprinted surface, with no minimum value of imprinting pressure within the imprinted surface, of one embodiment of a method for manufacturing a sheet having a fine shape transferred thereon of the present invention.

Next, FIG. 3 shows an example of a preferable imprinting pressure distribution of the present invention. A broken line a shown in FIG. 3 is a line within an imprinting surface, and a maximum imprinting pressure section is located on this line. Moreover, from this maximum imprinting pressure section toward the x-direction, the imprinting pressure is monotonically reduced without having a minimum value. FIG. 4 shows another example of the imprinting pressure distribution that is suitably applied to the present invention. In FIG. 4, a maximum imprinting pressure section is present along one end b in the x-direction of the imprinting surface, and from this maximum imprinting pressure section toward the x-direction, the imprinting pressure is monotonically reduced toward the other end without having a minimum value. By providing such an imprinting pressure gradient, even when, upon imprinting, an air trapping occurs between the imprint mold and the sheet-like resin material or between the intermediate base and the sheet-like resin material, the air is allowed to move toward the side having a lower imprinting pressure because of an imprinting pressure difference on the periphery of the air. That is, in the case of FIG. 3, residual air is discharged along the imprinting pressure gradient along the x-axis direction from the broken line a. In FIG. 4, residual air is discharged along the imprinting pressure gradient from one end to the other end in the x-axis direction of the imprinting surface. Moreover, this discharging force increases in proportion to the imprinting pressure difference on the periphery of the air. Since the air trapping is eliminated in this manner, it becomes possible to achieve uniform and highly accurate shape transfer. If there is a minimum value of the imprinting pressure within the imprinting surface, this portion becomes an air accumulate to cause an insufficient transfer process.

In particular, in the case when, as shown in FIG. 1, the concave shape of the fine shapes of texture of the imprint mold or the intermediate base is prepared as each of grooves that are extended linearly or in a curved shape in parallel with one another, and in the case when a plurality of grooves are placed in a stripe pattern in parallel with one other, in addition to the structure in which no portion where the imprinting pressure has a minimum value is present within the imprinting surface, a structure is preferably prepared in which a pressing process is carried out such that an imprinting pressure difference is present along the longitudinal direction of the grooves, a maximum imprinting pressure section is present, and the imprinting pressure has no minimum value. Since this structure prevents air enclosed into the groove and the sheet-like material from jumping over the con-vex portion of the fine shapes of texture to move to another groove, it becomes possible to form an imprinting pressure distribution along the groove and consequently to effectively exclude air. In this case, the expression "the imprinting pressure has a minimum value along the longitudinal direction of the groove" refers to a state in which, in the case when the imprinting surface is divided into lattices, with a length of one side being set to 10 mm, so as to be placed side by side in the longitudinal direction, and supposing that the average imprinting pressure within an arbitrary lattice is P, and that the average imprinting pressure of two adjacent lattices that are adjacent with this lattice in the longitudinal direction are $P_1$ and $P_2$, $P \leq P_1$ and $P \leq P_2$ are satisfied. That is, the expression "the imprinting pressure has no minimum value along the longitudinal direction of the groove" refers to a state in which no lattice that allows $P \leq P_1$ and $P \leq P_2$ to be satisfied is present along the longitudinal direction of the groove. In other words, with respect to all the lattices placed along the longitudinal direction of the groove, there is at least one adjacent lattice that satisfies $P_1 < P$ or $P_2 < P$.

Figure 5:
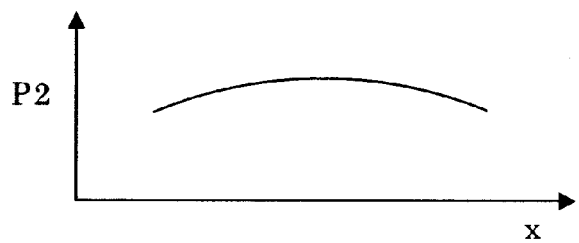
FIG. 5 is a schematic drawing that shows a front view of FIG. 3.
Figure 6:
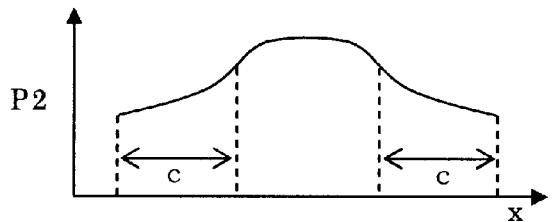
FIG. 6 is a schematic drawing that shows as a schematic model one example in which the amount of change in imprinting pressure is not monotonically increased in accordance with an imprinting pressure gradient.

In the method of the present invention, when pressing force of the pressing plates is maximized, the absolute value of the amount of change in the imprinting pressure is preferably increased monotonically along the imprinting pressure gradient from the maximum imprinting pressure section. FIG. 5 is a drawing that shows an imprinting surface pressure distribution viewed from the front face (negative direction of the y-axis) of FIG. 3. FIG. 6 is a drawing that shows an imprinting surface pressure distribution having an area c in which the absolute value of the amount of change in the imprinting, pressure is not increased monotonically along the imprinting pressure gradient from the maximum imprinting pressure section, viewed from the front face. FIG. 5 is a desirable pressure distribution in the present invention. More specifically, a parabola, an arc, a catenary curved line and the like may be used. Not particularly limited to these, any profile may be used as long as it allows the absolute value of the amount of change in the imprinting pressure to increase monotonically along the imprinting pressure gradient from the maximum imprinting pressure section.

In FIG. 5, since the imprinting pressure gradient is steep from the maximum imprinting pressure section in the center of the imprinting surface toward the end portions thereof, the discharging force increases as air moves toward the end portion. Thus, the air discharging velocity increases toward the end portion of the imprinting surface so that air can be excluded sufficiently even by application of pressure for a short period of time. That is, the forming cycle can be made faster to improve the productivity.

When the amount of change in imprinting pressure along the imprinting pressure gradient is monotonically reduced as shown in an area c of FIG. 6, the imprinting pressure gradient is gradual in this area. For this reason, the imprinting pressure difference on the periphery of trapped air becomes smaller to cause a reduction in the discharging force. Even in this case, air can be discharged; however, it takes long time to discharge the air. Therefore, from the viewpoint of productivity, the imprinting pressure distribution shown in FIG. 5 is desirably used.

Figure 11:
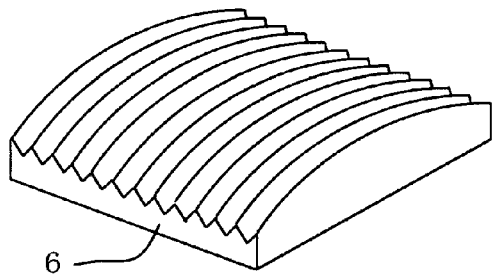
FIG. 11 is a schematic drawing that explains as a schematic model a structure in which the imprint mold is allowed to have a thickness distribution of one embodiment of the imprint mold of the present invention.
Figure 12:
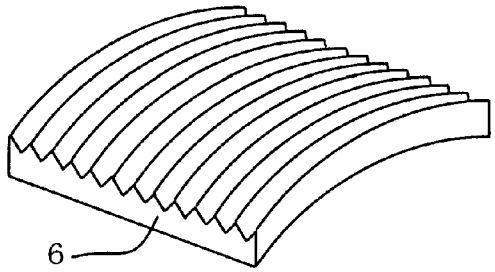
FIG. 12 is a schematic drawing that explains as a schematic model a structure in which the imprint mold is curved of one embodiment of the imprint mold of the present invention.
Figure 13:
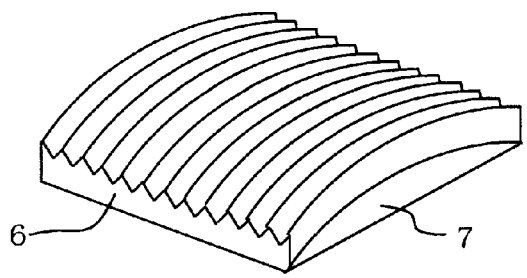
FIG. 13 is a schematic drawing that explains as a schematic model a structure in which a convex plate having a thickness distribution on the side reversed to the imprinted surface of the imprint mold of one embodiment of the imprint mold of the present invention.

In order to obtain a desirable imprinting pressure distribution of the present invention, the imprinting surface of an imprint mold is preferably curved into a convex shape toward the sheet-like material. Referring to FIGS. 11 to 13, the following description will discuss a method for curving the imprinting surface of the imprint mold.

FIG. 11 shows an example of an imprint mold that is allowed to have a thickness distribution. The thickness of this imprint mold is set such that a maximum value in thickness is present at one portion within the imprint mold imprinting surface, with no minimum value being present within the imprint mold imprinting surface. In the case when the fine shapes of texture of the imprint mold imprinting surface has a pattern in which a plurality of grooves are placed side by side in parallel with one another, the thickness of the imprint mold is preferably changed along the longitudinal direction of the grooves. More preferably, the thickness is set such that the absolute value of the amount of change in thickness is monotonically increased along the thickness gradient from the maximum thickness section. By providing such a thickness distribution so that a curved profile is given to the imprint mold imprinting surface, it is possible to obtain the desirable pressure distribution as described above at the time of imprinting.

In this case, the expression "having a minimum value in thickness" refers to a state in which, in the case when the imprinting surface is divided into a lattice pattern, with a length of one side being set to 10 mm, supposing that the average thickness within an arbitrary lattice is T, and that the average thickness of eight lattices that are made in contact with this lattice are $T_1$ to $T_8$, $T \leq T_x$ holds with respect to all the x's (where x is a natural number from 1 to 8). That is, the expression "having no minimum value in thickness with the imprinting surface" refers to the fact that no lattice which allows $T \leq T_x$ to be satisfied with respect to all the x's is present within the imprinting surface. In other words, with respect to all the lattices within the imprinting surface, there is at least one adjacent lattice that satisfies the average thickness $T_x < T$. The thickness difference between the maximum thickness section and the minimum thickness section is preferably set in a range from 1 µm to 500 µm, more preferably, from 1 µm to 200 µm. In the case when the thickness difference is less than 1 µm, a sufficient pressure gradient is not obtained at the time of imprinting to sometimes cause a failure in discharging air. Moreover, in the case when the thickness difference is more than 500 µm, a forming pressure is not applied sufficiently to a portion with a thin thickness to sometimes cause an insufficient transfer process.

The following description will discuss a method for manufacturing the imprint mold shown in FIG. 11. First, in order to provide a desired curved profile onto the imprinting surface side of a forming material, which will be described later, data of the curved surface is inputted to an NC machining device capable of carrying out a three-dimensional machining process, and the corresponding machining process is carried out. Next, by using a machining tool bit having the same shape as that of the cross section of the fine shapes of texture, a machining process is carried out by the NC machining device along the profile so that the fine shapes of texture are given to the imprint mold imprinting surface.

In FIG. 11, the curved profile is only given to the imprinting surface; however, the curved profile may be given to the surface reversed to the imprint mold imprinting surface, or each of the two surfaces of the imprint mold. In this case, first, the profile of the surface reversed to the imprint mold imprinting surface is first machined by the above-mentioned NC machining device. Next a forming material is set onto a stage of the NC machining device with a jig interposed therebetween so as to carry out a machining process on the imprinting surface. Next, the imprinting surface of the imprint mold can be machined into a curved shape and the fine shapes of texture by using the NC machining device through the above-mentioned method. The jig is used because, since the surface reversed to the imprinting surface of the imprint mold that has been machined has a curved surface, the surface is not directly placed on the stage of the NC machining device as a machining reference.

FIG. 12 shows one example of an imprint mold in which an imprint mold having a constant thickness is curved so that its center of curvature is present on the side opposite to the imprint mold imprinting surface so as to allow the imprint mold imprinting surface to have a curved profile. Upon imprinting fine shapes of texture onto the sheet-like material by using this imprint mold, the curved imprint mold is formed into a flat-plate shape when a pressure is applied thereto so that a repellent force is generated so as to return to its original curved shape. By this repellent force, a desired pressure distribution is obtained. The curvature radius of the curved surface is preferably set to 120 m to 60000 m, more preferably, to 300 m to 60000 m. When the curvature radius is less than 120 m, a pressure required for the forming process is not obtained on the entire imprinting surface to sometimes cause an insufficient transfer process. Moreover, in the case when the curvature radius is more than 60000 m, it is not possible to obtain a sufficient pressure gradient for discharging air.

In the same manner as in the imprint mold having a thickness distribution shown in FIG. 11, the imprint mold shown in FIG. 12 can be manufactured by using an NC machining device and a machining tool bit having the same shape as the cross section of the fine shapes of texture.

FIG. 13 is a drawing that shows one example in which an imprint mold is placed on a plate 7 having a thickness distribution, with the reversed surface to the imprint mold imprinting surface of the imprint mold being made in tightly contact with the plate 7. In this plate, the maximum value in thickness is present at one portion of the plane, with no minimum value in thickness being present within the plane. More preferably, the absolute value of the amount of change in thickness is increased monotonically along the thickness gradient from the maximum thickness section. By allowing the surface on the side reversed to the imprint mold imprinting surface to be made in tightly contact with this plate and held in this state, the imprint mold imprinting surface is allowed to have a curved profile.

As used herein, the expression "having no minimum value in thickness within the plane" has the same meaning as the expression "having no minimum value in thickness within the imprinting surface" in the aforementioned imprint mode. The thickness difference between the maximum thickness section and the minimum thickness section is preferably set in a range from 1 μm to 500 μm, more preferably, from 1 μm to 200 μm. In the case when the thickness difference is less than 1 μm, a sufficient pressure gradient is not obtained to sometimes cause a failure in discharging air. Moreover, in the case when the thickness difference is more than 500 μm, a forming pressure is not applied sufficiently to a portion with a thin thickness to sometimes cause an insufficient transfer process. Moreover, the plate is not necessarily required to be placed on the surface on the reversed side to the imprint mold forming surface. The plate may be placed at any position, such as on a pressing plate on the sheet-like material side opposite to the pressing plate on which the imprint mold is placed, as long as a desired pressure profile is given to the imprinting surface.

With respect to a material for the imprint mold, any material may be used as long as it provides desired strength, pattern machining precision and sheet-releasing property. For example, a metal material containing stainless, nickel, copper or the like, silicone, glass, a ceramic material and a resin, as well as those materials in which the surfaces of these materials are covered with an organic film for improving the mold-releasing property, may be used.

The desirable imprinting pressure distribution of the present invention described above can be obtained by pressing the sheet-like material between the imprint mold and the intermediate base. Without the intermediate base, since the imprinting force is applied only to the apex of the curved shape, a desired pressure distribution is not obtained, and an insufficient transfer process is also caused. In order to prevent these, the intermediate base is placed, and by deforming the intermediate base upon pressing, the pressing force is distributed over the entire imprinting surface so that the above-mentioned desirable imprinting pressure distribution of the present invention is obtained.

Moreover, the intermediate base is preferably designed to have a cushioning property. As used herein, the expression "having a cushioning property" refers to the fact that, when the applied pressure of the pressing plates is maximized, the intermediate base is deformed in accordance with the curved shape of the imprinting surface of the imprint mold, and has elasticity and flexibility that can absorb the thickness deviations in the imprint mold, the sheet-like material and the intermediate base of its own so that a repellent force is generated in response to the amount of deformation. By these elasticity and flexibility, the imprint mold and the sheet-like material are made in contact with each other without any gap, and the intermediate base and the sheet-like material are also made in contact with each other without any gap. As a result, it is possible to easily obtain the desirable imprinting pressure distribution of the present invention. Moreover, from the viewpoint of productivity, the intermediate base is preferably made from a material that has no change even after having been used repeatedly.

Figure 7A:
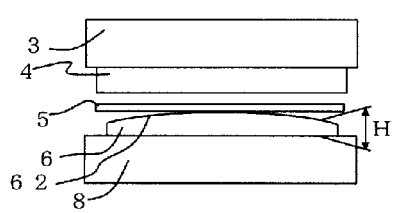
FIG. 7a and FIG. 7b are front views that explains as a schematic model the outline of a state in which an intermediate base is deformed along the shape of an imprint mold imprinting surface of one embodiment of the method for manufacturing a sheet having a fine shape transferred thereon of the present invention.
Figure 7B:
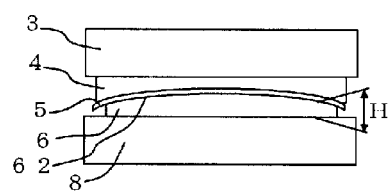

FIG. 7 is a conceptual drawing that shows a method for forming a desired imprinting pressure distribution of the present invention. In FIG. 7, reference numeral 3 represents an upper side pressing plate, 8 represents a lower side pressing plate, 5 represents a sheet-like material, 4 represents an intermediate base, 6 represents an imprint mold, and 62 represents an imprint mold imprinting surface. FIG. 7 (a) shows a state prior to application of pressure, and FIG. 7 (b) shows a state in which the pressure is being applied. Moreover, a distance H is a distance between the upper surface of the lower side pressing plate and the imprint mold imprinting surface.

The intermediate base, which has been set to a flat-plate state prior to application of pressure, is deformed in accordance with the curved shape of the imprint mold imprinting surface during the application of pressure. In particular, since the intermediate base has a cushioning property, it is easily deformed following the curved shape of the imprint mold imprinting surface. The imprinting pressure is determined in association with the amount of deformation in the intermediate base and the compressive elastic modulus of the intermediate base, and as a portion has a greater amount of deformation, the corresponding imprinting pressure becomes greater at the portion. In the state where the pressure is being applied in FIG. 7 (b), the amount of deformation in the intermediate base is maximized in the center of the imprint mold imprinting surface, and the corresponding pressure decreases toward the end portion. This indicates that the applied pressure is maximized in the center of the imprinting surface, and that the imprinting pressure monotonically decreases toward the end portion. As described earlier, by using this imprinting pressure difference, trapped air at the time of imprinting can be excluded.

In this case, the compressive elastic modulus of the intermediate base is preferably set in a range from 0.1 MPa to 200 MPa, more preferably, from 0.1 MPa to 50 MPa. When the compressive elastic modulus is lower than 0.1 MPa, the imprinting pressure difference within the imprinting surface becomes smaller to sometimes cause a failure in removing air. Moreover, a period of time required for removing air becomes longer to cause degradation of productivity. In the case when the compressive elastic modulus is greater than 200 MPa, since the imprinting pressure difference within the imprinting surface becomes too large, a forming pressure is not applied sufficiently to a portion with a thin thickness to sometimes cause an insufficient transfer process. By applying an appropriate compressive elastic modulus to the intermediate base, it is possible to obtain an appropriate imprinting pressure distribution for excluding trapped air. As a result, the air trapping problem can be eliminated to consequently improve the productivity.

The thickness of the intermediate base is preferably set in a range from 0.1 mm to 50 mm, more preferably, from 0.3 mm to 30 mm. When the thickness is thinner than 0.1 mm, the amount of deformation in the intermediate base becomes smaller and the cushioning property becomes poor, with the result that it fails to sufficiently follow the curved shape of the imprint mold to sometimes cause an insufficient transfer process. When the thickness is thicker than 50 mm, the amount of compressive deformation of the intermediate base becomes greater at the time of applying a pressure, with the result that the stroke of the pressing plates needs to be made longer. This causes an increase in facility costs and degradation of the manufacturing cycle, resulting in inefficiency of the processes.

Specific examples of the intermediate base having these characteristics include rubbers, such as natural rubber, isoprene rubber, styrene rubber, butadiene rubber, styrene-butadiene rubber, chloroprene rubber, silicone rubber, fluoro rubber, ethylene-propylene rubber, urethane rubber, nitrile rubber and butyl rubber. Moreover, those rubber materials that have sufficient heat resistance at (glass transition point+ 50° C.) of the sheet-like material are preferably used. More specifically, silicone rubber and fluoro rubber are more preferably used.

Moreover, since the intermediate base has a cushioning property as described above, those materials that have a volume change upon receiving a stress to be deformed are preferably used. This is because, in the case of a large area of the imprinting surface, when the rubber material is compression-deformed along the curved shape of the imprint mold, the volume corresponding to the deformed portion is no longer received by any place to cause an apparent elastic modulus to become very large, making it difficult to follow the curved shape. For this reason, the intermediate base is preferably designed to have a volume-changing property. As a method for achieving this property, the following materials are preferably used: (a) a polymer material having pores inside, such as sponge, with the polymer being preferably made from a resin or rubber; (b) a composite material having a rubber and a volume-changing layer laminated therein; and (c) a composite material in which a volume-changing layer is impregnated with rubber. Moreover, desired combinations of the above-mentioned (a) to (c) may be preferably used in the present invention. The volume-changing layer may be preferably prepared as a knitted material or a textile of fibers, or a non-woven cloth or the like, and a laminated material of these. When the intermediate base is made of these materials, it is possible to obtain a desired cushioning property easily.

In the case when each of these rubber materials and rubber composite materials is directly used as the intermediate base, however, since the frictional coefficient relative to the sheet-like material becomes higher, the sliding property sometimes tends to deteriorate. When a slackened portion is present in the sheet-like material or the intermediate base before the forming process in this state, this slackened portion is not eliminated due to friction between the intermediate base member and the sheet-like material even upon application of a forming pressure, with the result that uneven transfer tends to occur. In order to prevent this, an embossing process is preferably carried out on the intermediate base to reduce a contact area with the sheet-like material so that the frictional coefficient is preferably lowered. Alternatively, a sheet having a superior sliding property relative to the sheet-like material, such as a fluoro resin sheet and a polyester resin sheet, is preferably placed, on a surface opposed to the sheet-like material of the intermediate base. Additionally, the intermediate base is not necessarily formed by one kind of material, and may be prepared by freely combining the above-mentioned rubbers, fluoro resin and polyester resin with one another.

Moreover, in the present invention, the absolute value of the amount of change in distance H is preferably set so as to monotonically increase along the imprinting pressure gradient from a point where H has a maximum value. With this arrangement, the absolute value of the amount of change in the imprinting pressure is allowed to monotonically reduce along the imprinting pressure gradient from the maximum imprinting pressure section. As a result, the preferable imprinting pressure distribution of the present invention, as described above, can be obtained.

Additionally, in order to confirm the imprinting pressure distribution obtained by the above-mentioned structure, a method for pressing pressure-sensitive paper thereon may be used, or another method in which a sheet that is plastically deformed in response to a pressure is pressed thereon so that the amount of change in thickness after the pressing process is measured, may be used.

In the present invention, by forming an imprinting surface made of the thin shapes of texture also on the intermediate base, not only the surface on the imprint mold side of the sheet-like material, but also the surface on the intermediate base side thereof may be subjected to an imprinting process so as to have the fine shapes of texture.

Figure 10:
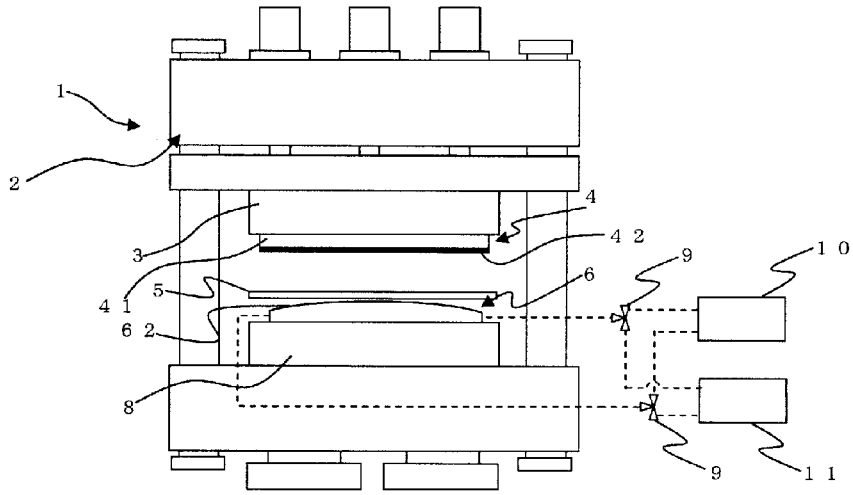
FIG. 10 is a schematic front view that shows as a schematic model one embodiment of a manufacturing device for a sheet having a fine shape transferred thereon of the present invention.

In order to form the fine shapes of texture to be desirably imprinted on the intermediate base, a method for directly machining the surface of the intermediate base with an NC machining device or the like is proposed, and another method in which, in the case when only a random pattern of texture are required, the texture may be formed on the surface by using a shot blasting process, an etching process, a plasma process or an excimer laser. Moreover, as shown in FIG. 10, a method in which a transfer sheet is laminated on a cushion material to form an intermediate base so that this transfer sheet is used as an imprinting surface of the intermediate base may be preferably used in the present invention. Since this transfer sheet must not interfere with the cushioning property of the cushion material, a material having flexibility is preferably used as the transfer sheet. In this manner, by preparing the cushion material and the transfer sheet as different members, they can be easily optimized respectively so that a desired imprinting pressure distribution and the desired fine shapes of texture can be obtained, thereby providing a superior transferring property.

As such a transfer sheet, an electroformed sheet produced by using the following method may be used. That is, a master mold in which the fine shapes of texture to be desirably transferred onto a surface of the sheet-like material opposed to the intermediate base is formed by using an NC machining device or the like is prepared, and this master mold is put into a plating vessel so that the master mold is plated, and after having been taken out of the plating vessel, the plated portion is separated so that a transfer sheet is formed. As the metal to be plated, nickel or its alloy is preferably used; however, another metal may also be used.

In the transfer sheet of the present invention, a resin sheet is more preferably used. In the case when a heat resistant material such as fluoro resin and silicone resin is used, the fine shapes of texture can be formed on a sheet by using a machining process by the use of an NC machining device so that the transfer sheet can be produced. Moreover, in the case when polydimethyl siloxane is used as the material, in addition to the machining process, the fine shapes of texture can be formed by using a photolithography method.

Examples of a preferable material for the transfer sheet include resin materials having a thermoplastic property, such as polyester-based resins, like polyethylene terephthalate, polyethylene-2,6-naphthalate, polypropylene terephthalate and polybutylene terephthalate, polyolefin-based resins like polyethylene, polystyrene, polypropylene, polyisobutylene, polybutene and polymethyl pentene, polyamide-based resins, polyimide-based resins, polyether-based resins, polyester amide-based resins, polyether ester-based resins, acrylic resins, polyurethane-based resins, polycarbonate-based resins, or polyvinyl chloride-based resins. Among these, because of reasons that a variety of copolymerizable monomer types are available and that consequently, adjustments of the material physical properties are easily carried out, in particular, thermoplastic resin, selected from a group consisting of polyester-based resins, polyolefin-based resins, polyamide-based resins, acrylic resins and a mixture of these, is mainly used to provide the transfer sheet. Moreover, 50% by weight or more of the entire transfer sheet is preferably composed of the above-mentioned thermoplastic resin.

In order to form the fine shapes of texture on these materials, a master mold having the fine shape of texture to be transferred onto the surface of the sheet-like material opposed to the intermediate base is prepared, and after heating this master mold, a mold and a thermoplastic sheet may be pressed thereon by using a pair of pressing plates. As the device used for obtaining the transfer sheet, a transferring device for the fine shapes of texture of the present invention may be used. By preparing the transfer sheet as a resin sheet in this manner, another device for forming the transfer sheet becomes unnecessary, which makes this method different from the method using the electroformed sheet; therefore, it becomes possible to obtain a transfer sheet at low costs in a short period of time, simply by preliminarily producing the master mold.

Additionally, in the case when only a random pattern of texture is required as the shapes to be imprinted on the surface of the sheet-like material opposed to the intermediate base, a texture may be formed on the resin sheet surface by using a shot blasting process, an etching process, a plasma process or an excimer laser.

In the case when the fine shapes of texture are formed on each of the two surfaces of the sheet-like resin material, only the imprint mold is preferably heated from its inside. This arrangement is used because, since a heat source is located in the imprint mold that is directly made in contact with the sheet-like material, heat transfer resistance between the heat source and the sheet-like material is small so that the sheet-like material can be heated quickly to a desired temperature. With this arrangement, even in the case when the fine shapes of texture are imprinted on each of the two surfaces of the sheet-like material by using the aforementioned method, the surface of the sheet-like material opposed to the intermediate base can be easily raised to a desired temperature in a short period of time, without a heat source being provided on the intermediate base side, thereby making it possible to also transfer the fine shapes of texture formed on the intermediate base onto the sheet-like material. In other words, it becomes unnecessary to provide a special heating source on the intermediate base side so that the facility costs can be cut and energy consumption can be reduced. In this case, the term "desired temperature" refers to a temperature range from (a glass transition temperature+10° C.) or more to (the glass transition temperature+50° C.) or less of the sheet-like material. When the temperature is lower than (the glass transition temperature+10° C.), the transferring property of the fine shapes of texture onto the sheet-like material might deteriorate. Moreover, when the temperature is higher than "the glass transition temperature+50° C.", the sheet-like material might deteriorate.

The ratio of thermal capacities between the entire imprint mold and the entire sheet-like material is preferably set from 100:1 or more to 500:1 or less. In the case when the ratio is less than 100:1, upon heat transfer from the imprint mold to the sheet-like material, the temperature drop of the imprint mold becomes greater, sometimes resulting in a failure in sufficiently heating the sheet-like material. Moreover, in the case when the ratio is greater than 5000:1, it takes long time to heat the imprint mold to make the process inefficient. In an attempt to make the ratio greater than 5000:1, it is necessary to provide a large-size imprint mold so as to ensure a sufficient thermal capacity, failing to provide an economical system, as well as making it difficult to handle the imprint mold.

The thermal conductivity to the sheet-like material upon application of a pressure is influenced by the kinds of the fine shapes of texture formed in the imprint mold, the surface states of the imprint mold and the material, and the applied pressure; thus, it is preferably set in a range from 50 W/m²·K to 5000 W/m²·K. In the case of less than 50 W/m²·K, it takes too much time to heat the sheet-like material to sometimes cause degradation of the production efficiency. Moreover, making the thermal conductivity greater than 5000 W/m²·K is very difficult in practice.

In order to heat the imprint mold from the inside thereof, a method for allowing an electric current to flow through the imprint mold itself so as to heat it by Joule heating or a method in which an electric heater is embedded into the imprint mold may be used; however, in the present invention, a method is preferably used in which a heating medium passage is formed in the imprint mold and a heating medium is allowed to flow through this so as to heat the imprint mold.

Figure 8A:
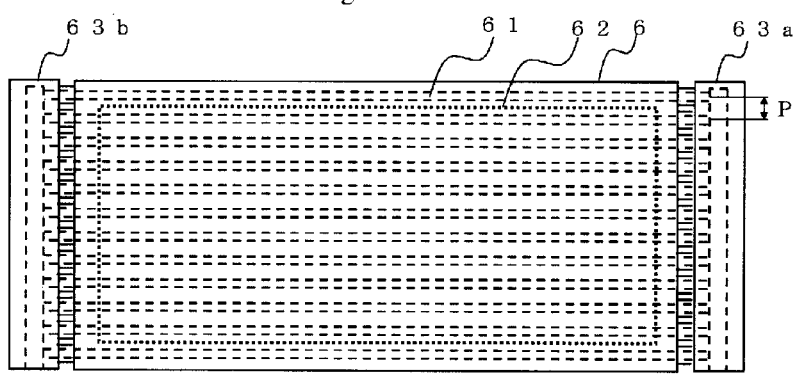
FIG. 8a and FIG. 8b are schematic drawings of the plan and front views of a schematic model of the imprint mold of the present invention.
Figure 8B:
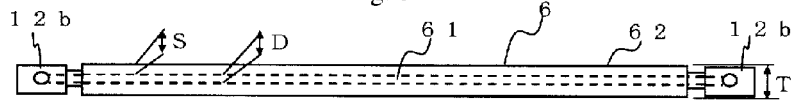

Referring to FIG. 8, the following description will discuss the imprint mold of the present invention with a preferable heating medium passage formed therein in detail. As shown in a plan view of FIG. 8(a) and a side view of FIG. 8(b), an imprint mold 6 has an imprinting surface 62, and a flow passage 61 is formed therein. Reference numeral 63a represents a manifold toward a heating medium, 63b represents a return-manifold from the heating medium, P represents a flow-passage pitch in which the flow passage 61 is formed, T represents a thickness of the imprint mold, S represents a distance (shortest portion) from the flow passage to the imprinting surface 62, and D represents a diameter of the flow passage; thus, these values respectively have desirable ranges so as to positively obtain heating effects, and consequently to efficiently obtain the effects of the present invention. In accordance with various findings of the present inventors, the P/S value is preferably set in a range from 1 to 4. When the value is less than 1, the heating rate on the surface becomes lower. When the value is more than 4, temperature unevenness tends to occur on the imprint mold surface. The thickness of the imprint mold T is preferably set in a range from 20 mm to 50 mm. When the thickness is less than 20 mm, the flatness of the imprint mold tends to deteriorate, and this state is not preferable depending on the dimension or the like of the sheet-like material. Moreover, when the thickness is less than 20 mm, the thermal capacity of the imprint mold becomes smaller, thereby causing a great temperature drop of the imprint mold, upon heating the sheet-like material. In the case when the thickness is larger than 50 m, in general, it takes too much time to heat the imprint mold. The diameter D of the flow passage is preferably set in a range from 4 mm to 8 mm. When it is less than 4 mm, the machining process of the flow passage becomes difficult, and the pressure loss tends to become greater. When it is greater than 8 mm, the border-film heat conduction coefficient from the heating medium to the flow passage wall face is lowered, consequently resulting in a long period of time required for heating. Moreover, Reynolds number of the heating medium flow passage is preferably set from $1.0 \times 10^4$ to $12 \times 10^4$ so as to efficiently transfer heat. In order to realize uniformity of the temperature distribution of the imprinting surface, the imprinting surface 62 is preferably formed on an inner side from the flow passages located on the end portion. Moreover, flow directions of the heating medium in the respective flow passages are preferably reversed so as to allow the heating medium to flow in reversed directions between adjacent flow passages, so as to minimize temperature unevenness, in particular, during the heating process. In this case, the term "adjacent flow passages" includes a state in which every plurality of passages is adjacent to each another, such as a state in which every two passages is adjacent to each other, in addition to a state in which each passage is adjacent with each other one by one.

Moreover, in the present invention, a structure is adopted in which the heating medium is circulated and temperature-adjusted in a portion other than the imprint mold unit even during a non-heating state of the imprint mold, and during both of the heating process of the imprint mold and the non-heating state thereof, the inner capacity of the flow passages (hereinafter, referred to as heat-medium circulation common passages) is preferably ensured sufficiently relative to the imprinting area of the imprint mold. In this case, the expression "to be ensured sufficiently" refers to the fact that a capacity that is more than the volume of the heating medium required for the imprint mold heating process of one time is ensured. In the case when, after the heating medium has passed through the inside of the imprint mold in the imprint mold heating process, the heating medium is again introduced into the imprint mold without having been sufficiently reheated, the heating rate becomes lower in the middle of the process since the initial temperature of the heating medium is low to cause the heating time to become longer. By sufficiently ensuring the inner capacity of the heat-medium circulation common passages, it is possible to prevent the heating rate from becoming lower due to the low initial temperature of the heating medium. Additionally, a commercially available temperature adjusting device has a heater tank capacity of only about 10 L, with its heater capacity being about 20 kW; therefore, in the case of a large imprinting surface of 300 mm or more in one side, a buffer tank in which a heater is installed is preferably attached to the middle portion of the heat-medium circulation common passages in a separated manner.

Figure 9:
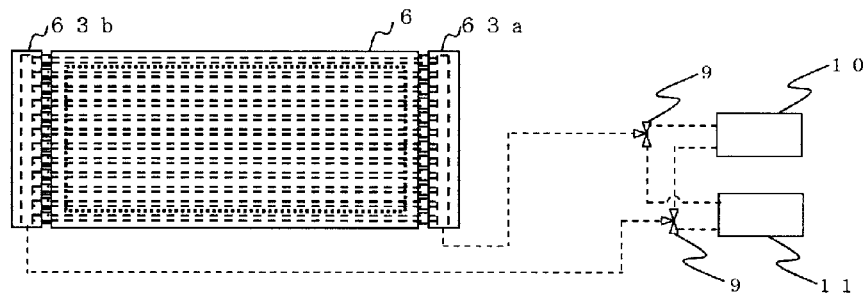
FIG. 9 is a schematic drawing that explains as a schematic model a connected state of a heating device and a cooling device to the imprint mold of the present invention

Moreover, a cooling means is preferably installed in the imprint mold. In this case, the cooling means can be achieved, for example, by forming a flow passage through which a cooling medium is allowed to flow in the imprint mold. The cooling medium flow passage may be prepared separately from the heating medium passage, or more preferably, may be prepared as a commonly-used passage with the heating medium passage. In the case when prepared as the commonly-used passage with the heating medium passage, a switching means that switches the same flow passage on demand between the heating medium and the cooling medium so as to circulate them is preferably prepared. For example, as shown in FIG. 9, a heating device 10 for circulating the heating medium and a cooling device 11 for circulating the cooling medium are preferably connected to the imprint mold through a switching valve 9 so that the heating medium and the cooling medium are switched and allowed to flow through the imprint mold. Additionally, the same medium is preferably used as the heating medium and the cooling medium, and water having a high heat transfer function is preferably used. Moreover, since it is not necessary to drive the residual medium inside the imprint mold out thereof, upon switching the heating medium and the cooling medium, this makes it possible to shorten the cycle. With this arrangement, it becomes possible to heat and/or cool the imprint mold more quickly with high precision.

Moreover, in the cooling process also, since the heat absorbing source is present inside the imprint mold so that the sheet-like material can be cooled quickly, no special heat absorbing source with respect to the intermediate base is required for the same reason as the reason that no heating source is required with respect to the intermediate base.

Furthermore, with respect to the inner capacity of the flow passage (hereinafter, referred to as cooling medium circulation common passage) through which a cooling medium is allowed to flow both of the cooling process and non-cooling process of the imprint mold, the same is true as the inner capacity of the heating medium circulation common passage, and an inner capacity increasing means such as a buffer tank is preferably installed in the middle of the cooling medium circulation common passage so as to prevent the cooling rate from becoming slower.

The above-mentioned description has discussed a structure in which, with the fine shapes of texture being formed also on the intermediate base, a fine convex/concave shape is formed on each of the two surfaces of the sheet-like material; however, even in the case when the imprinting process is carried out only on the imprint mold side of the sheet-like mold, by heating only the imprint mold from the inside thereof, the sheet-like material can be heated quickly to improve the productivity.

The manufacturing method of the present invention can be executed by using the following manufacturing device (I) or (II).

(I) A device for manufacturing a sheet having a fine shape transferred thereon provided with, at least, the imprint mold of the present invention, an intermediate base, a pair of pressing plates that are placed so as to further sandwich the imprint mold and the intermediate base from the two sides, and a pressing means that applies a pressure to the imprint mold, the intermediate base and the paired pressing plates.

(II) A device for manufacturing a sheet having a fine shape transferred thereon provided with, at least, an imprint mold having an imprinting surface having the fine shape of texture, an intermediate base, pressing plates that are placed so as to further sandwich the imprint mold and the intermediate base from the two sides, a pressing means that applies a pressure to the imprint mold, the intermediate base and the paired pressing plates and, and a plate having a convex shape that is placed at least on the surface of one of the pressing plates on the pressure-applying direction side of the paired pressing plates, and the plate has a thickness distribution so that a maximum thickness portion is present within the plane of the plate, with no portion where a minimum value in thickness is located within the plane.

In particular, in the manufacturing device (II), the imprinting surface of the imprint mold needs not be curved into a convex shape toward the sheet-like material.

Moreover, in the manufacturing device (II), in the case when the concave shapes of the fine shapes of texture of the imprinting surface of the mold or the concave shapes of the fine shapes of texture of the imprinting surface of the intermediate base are prepared as a plurality of grooves arranged side by side in parallel with one another, the plate is preferably placed in such as manner as to allow the change in thickness of the plate to be made coincident with the longitudinal direction of the grooves. By placing the plate in this manner, a pressure can be applied so that an imprinting pressure difference is present along the longitudinal direction of the grooves, with a maximum pressure section being present, and the imprinting pressure does not have a minimum value.

Moreover, in the manufacturing device (II), the absolute value of the amount of change in the thickness per unit length of the plate is preferably increased monotonically along the thickness gradient from the maximum thickness section. By designing the thickness in this manner, the absolute value of the amount of change in the pressure can be increased monotonically along the pressure gradient from the maximum imprinting pressure section at the time of the maximum applied pressure.

Figure 18:
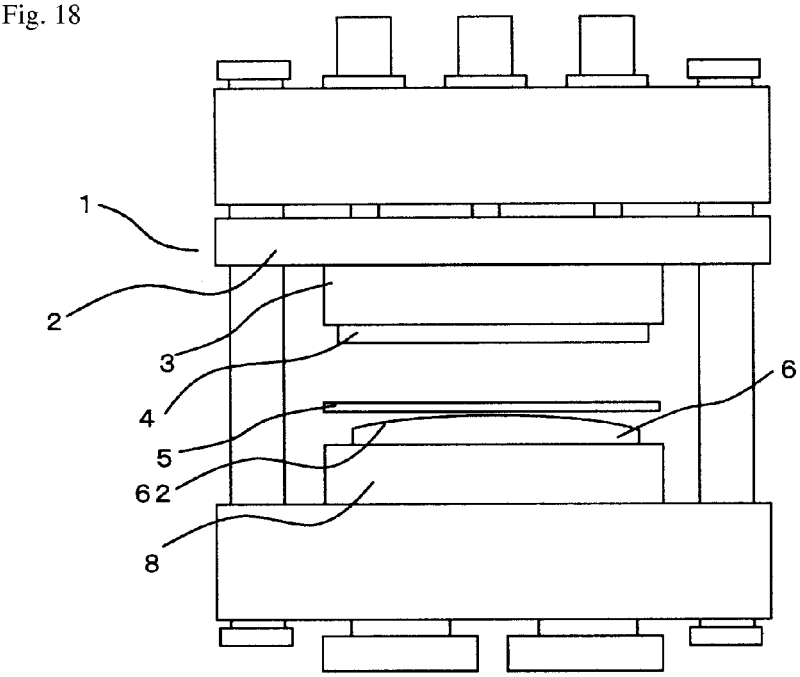
FIG. 18 is a schematic front view that shows as a schematic model one embodiment of a manufacturing device for a sheet having a fine shape transferred thereon of the present invention.
Figure 19:
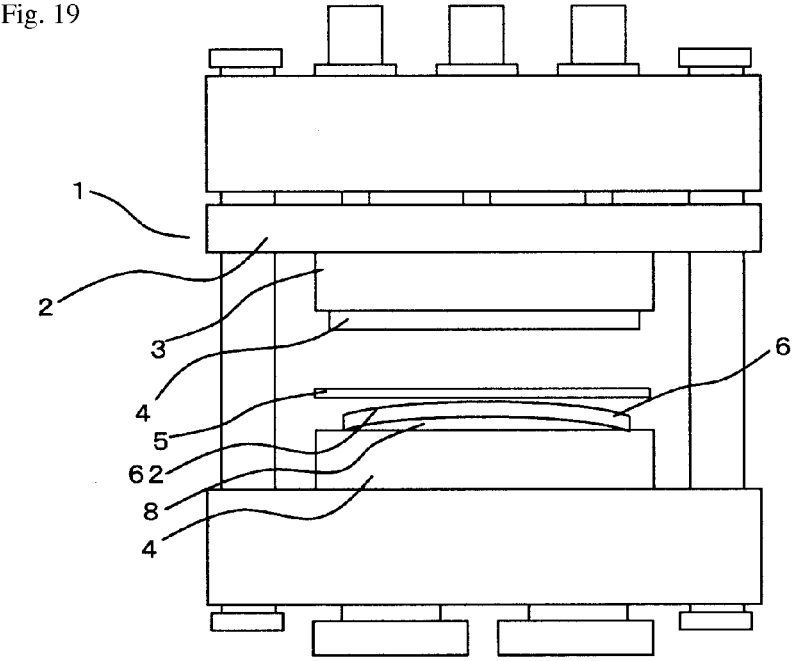
FIG. 19 is a schematic front view that shows as a schematic model another embodiment of the manufacturing device for a sheet having a fine shape transferred thereon.

Each of FIGS. 10, 18 and 19 is a schematic front view that shows as a schematic model one embodiment of a manufacturing device for a sheet having a fine shape transferred thereon of the present invention.

FIG. 18 shows a manufacturing device for a sheet having a fine shape transferred thereon in which an imprint mold is provided with a thickness distribution, with the imprinting surface being formed into a curved shape. FIG. 19 shows a manufacturing device for a sheet having a fine shape transferred thereon in which, by installing a plate provided with a thickness distribution onto the pressure plate, the imprinting surface of the imprint mold is formed into a curved shape. FIG. 10 shows a modified device in which the manufacturing device for a sheet having a fine shape transferred thereon of FIG. 18 is further revised so that the intermediate base has a cushioning property, with the intermediate base being also provided with an imprinting surface. Reference numeral 1 represents a manufacturing device for a sheet having a fine shape transferred thereon, 2 represents a pressing device, 3 represents an upper side pressing plate, 8 represents a lower side pressing plate, 5 represents a sheet-like material, 4 represents an intermediate base, 41 represents a member having a cushioning property (hereinafter, referred to as "cushion member"), 42 represents an intermediate base imprinting surface, 6 represents an imprint mold, and 62 represents an imprint mold imprinting surface. The imprint mold is placed in such a manner that the imprinting surface protrudes toward the sheet-like material. In FIG. 19, the plate having a thickness distribution is placed between the imprint mold and the lower side pressing plate; however, this may be placed, for example, between the upper side pressing plate and the intermediate base as long as it can provide the desired imprinting pressure distribution on the imprinting surface.

A press is connected to a hydraulic pump and an oil tank, not shown, and by the hydraulic pump, the upper side pressing plate 3 is raised and lowered and the pressing force thereof can be controlled. In the present invention, a press cylinder of a hydraulic system is applied; however, any system may be used as long as it can control the pressing force.

The press pressure is preferably controlled within a range from 0.1 MPa to 20 MPa, and more preferably controlled within a range from 1 MPa to 10 MPa. When the press pressure is smaller than 0.1 MPa, it is sometimes not possible to obtain a sufficient pressure to transfer the fine shapes of texture. When the press pressure is greater than 20 MPa, an excessively large facility is required, failing to provide an economical system.

In the imprint mold 6 of the present invention, a heating medium/cooling medium circuit used for temperature adjustments is installed, as described earlier, and the heating medium or the cooling medium is supplied from a heating medium temperature-adjusting pump 10 and a cooling medium temperature-adjusting pump 11 through a switching valve 9 so that the heating process and cooling process of the imprint mold can be carried out.

Moreover, as described earlier, in the present invention, by forming an imprinting surface having the fine shapes of texture on the intermediate base also, not only the surface of the sheet-like material on the imprint mold side, but also the surface thereof on the intermediate base side is imprinted with the fine shapes of texture. The means for use in forming the imprinted surface having the fine shapes of texture on the intermediate base is the same as that described before.

Figure 14:
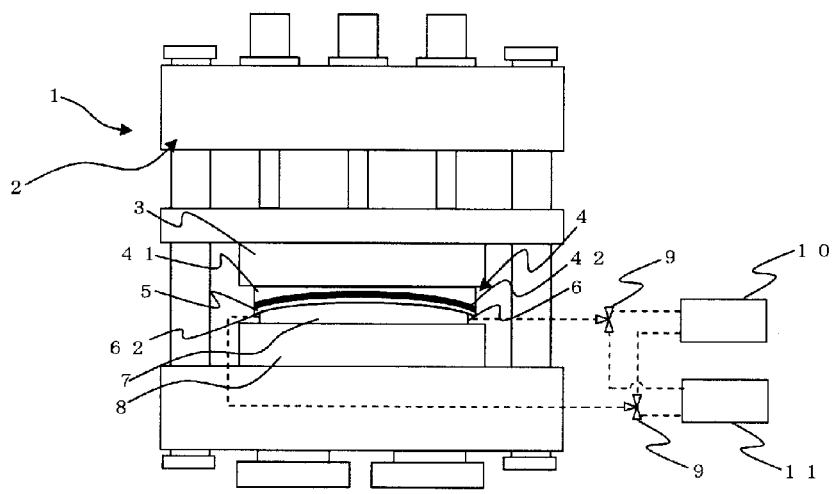
FIG. 14 is a schematic front view that shows as a schematic model a state in which the pressing force of a pressing plate is maximized in FIG. 10.

FIG. 14 is a schematic front view that shows as a schematic model a state in which the pressing force on the imprinting surface is maximum by using the manufacturing device for a sheet having a fine shape transferred thereon of the present invention shown in FIG. 10. As described earlier, the intermediate base is deformed in accordance with the curved shape of the imprint mold imprinting surface 62 so that a desired imprinting pressure distribution is obtained.

The sheet-like material to be applied to the present invention is a sheet mainly composed of a thermoplastic resin having a glass transition temperature Tg preferably in a range from 40° C. to 180° C., more preferably, from 50° C. to 160° C., most preferably, from 50° C. to 120° C. In the case of the glass transition temperature Tg of less than 40° C., the formed product becomes poor in heat resistance, with its shape easily changed with time. In the case of the glass transition temperature Tg exceeding 180° C., the forming temperature needs to be inevitably changed, making the product inefficient from the view point of energy. Moreover, upon heating/cooling the sheet-like material, the volume variation becomes greater, with the result that the sheet-like material is meshed with the imprint mold to be hardly released therefrom, or even when released therefrom, the transfer precision of the pattern might be lowered, or the pattern might be partially broken to cause defects.

Preferable examples of the thermoplastic resin forming a main component of the sheet-like material to be applied to the present invention, specifically, include: polyester-based resin, such as polyethylene terephthalate, polyethylene-2,6-naphthalate, polypropylene terephthalate, and polybutylene terephthalate; polyolefin-based resin, such as polyethylene, polystyrene, polypropylene, polyisobutylene, polybutene and polymethylpentene; polyamide-based resin; polyimide-based resin; polyether-based resin; polyester amide-based resin; polyether ester-based resin; acrylic resin; polyurethane-based resin; polycarbonate-based resin; and polyvinyl chloride-based resin. Among these, because of reasons that a variety of copolymerizable monomer types are available and that consequently, adjustments of the material physical properties are easily carried out, in particular, a thermoplastic resin, selected from a group consisting of polyester-based resin, polyolefin-based resin, polyamide-based resin, acrylic resins and a mixture of these, is mainly used. Moreover, 50% by weight or more of the entire sheet-like material is preferably composed of the above-mentioned thermoplastic resin.

The sheet-like material to be applied to the present invention may be a sheet made from a single substance of the above-mentioned resins, or may be prepared as a laminated body including a plurality of resin layers. In this case, in comparison with the single-substance sheet, it becomes possible to provide surface characteristics, such as an easily sliding property and a friction resistant property, mechanical strength and heat resistance. When prepared as such a laminated body made of a plurality of resin layers, the entire sheet is preferably designed to satisfy the aforementioned requirements. However, even in the case when the aforementioned requirements are not satisfied as the sheet as a whole, as long as a layer that satisfies the aforementioned requirements is formed as a surface layer, the fine shapes of texture may be easily formed on the surface layer.

Moreover, in the case when a sheet wound into a roll is intermittently formed, a desirable thickness (width, film thickness) of the sheet-like material to be applied to the present invention is preferably set to 0.01 to 1 mm. When the thickness is less than 0.01 mm, the thickness is not sufficient to be formed. When the thickness is thicker than 1 mm, the heat transfer efficiency from the surface of the sheet-like material on the imprint mold side to the surface thereof on the intermediate base side deteriorates to cause much time required for the surface on the intermediate base side to reach a temperature capable of imprinting, resulting in degradation of the production efficiency. Moreover, in general, when it is thicker than 1 mm, the transporting process becomes difficult.

EXAMPLES

Based upon examples, the following description will discuss the method, specific structures of the device and effects of the present invention. In the following examples, fine-shape forming processes were carried out by using the imprint mold, press device and processing conditions based upon specifications as indicated in (1) to (10), and transfer sheets having a fine shape were produced. These examples are intended to be an example of the embodiments, and are not intended to limit the scope of the present invention.

Example 1

Figure 15A:
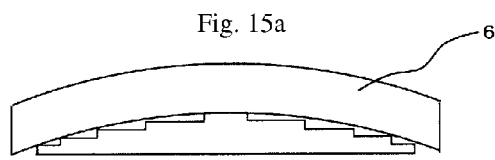
FIG. 15a is a schematic front view that shows as a schematic model a mold set state used in examples 1 and 2 and FIG. 15b is a schematic drawing that shows as a schematic model an imprinting distribution of examples 1 and 2.
Figure 15B:
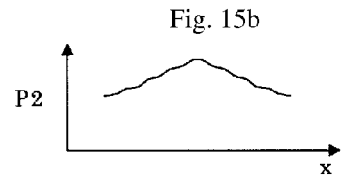

(1) Size of imprint mold: 500 mm (sheet width direction)× 800 mm (sheet traveling direction)×30 mm (thickness)
(2) Material of imprint mold: copper
(3) Fine shapes of texture of imprint mold: An imprint mold having grooves that are arranged in a stripe pattern, each having a pitch of 50 μm, a width of convex portion of 25 μm and a height of convex portion of 50 μm, and a semi-elliptical shape in its cross section, when viewed in the travelling direction of the sheet, was used.
(4) Press machine: capable of applying a pressure up to maximum 3000 kN, with the applied pressure being given by a hydraulic pump.
(5) Temperature adjustments: A temperature-adjusting heat medium passage was formed in the imprint mold, and the heating process was carried out with water at a temperature of 125° C. and the cooling process was carried out with water at a temperature of 50° C.
(6) Sheet-like material: made from polyethylene terephthalate, with a thickness of 120 μm and a width of 520 mm.
(7) Intermediate base: Silicone rubber having a thickness of 300 μm and a smoothed film, made of a polyester-based resin, having a thickness of 200 μm were laminated to each other, and this was pasted to an upper side pressing plate. At this time, the smoothed film was superposed in such an order as to be made in contact with the sheet-like material.
(8) Installation method of imprint mold: A convex plate as shown in FIG. 15(a) was placed on the side face reversed to the imprinting surface of the imprint mold, and the side face reversed to the imprinting surface of the imprint mold was made tightly in contact with the plate to be fixed thereon.
(9) A film whose amount of plastic deformation changes in response to a pressure was pressed, and the thickness of the film after the pressing process was measured at intervals of 10 mm. The measurements were carried out so as to allow lattices, each having 10 mm in one side, to be aligned in the longitudinal direction of the grooves (hereinafter, referred to as a groove longitudinal direction) on the imprint mold imprinting surface at the time of pressing. The imprinting pressure distribution in the longitudinal direction of the grooves was examined so that an imprinting pressure distribution, as shown in FIG. 15(b), was obtained. That is, a maximum imprinting pressure section is present in the center portion of the imprinting surface, and although no minimum imprinting pressure section is present within the imprinting surface, the amount of reduction in the imprinting pressure along the imprinting pressure gradient is not monotonically increased.
(10) By using the above-mentioned device, a forming process was carried out in the following manner.

Preliminarily, a sheet-like material was put on an imprint mold. Next, temperature-adjusting water was allowed to flow through the imprint mold so that the imprint mold was heated up to a temperature of 105° C. An upper side pressing plate to which an intermediate base had been attached was lowered so that the pressing process of the sheet-like material was started. The pressing process was carried out at 1700 kN for three seconds. The temperature-adjusting water flow was stopped during the pressing process. Thereafter, with the pressing process being continued, cooling water was allowed to flow through the imprint mold, and the cooling process was stopped when the temperature of the imprint mold had become 70° C., and the press was opened. Thereafter, the sheet was released from the imprint mold.

The above-mentioned operation was repeated so that 10 sheets of formed sheets on which a fine shape with a texture was formed on the sheet-like material on the imprint mold side were obtained. As a result of visual evaluations of the formed surfaces, a superior transferring process was obtained at an area of 95% of the formed surface; however, air tapping and defective transfer were slightly found at an area of 5%. Moreover, when the filling rate of the resin was measured at 10 points within the imprinting surface by using a scanning electron microscope, an average value of 85% was obtained. In this case, the term "filling rate" refers to a value that is obtained as a value of percentage B/A, supposing that a distance from the apex of the convex shape of the fine shapes of texture to the bottom of the concave shape of the mold is A and that a distance from the apex of the convex shape to the bottom of the concave shape of the fine shapes of texture transferred on the sheet-like material is B.

Example 2

The same processes as those of example 1 were carried out, except that the pressing time by the pressing plate was set to 15 seconds, so that 10 sheets of formed sheets were produced. As a result of visual evaluations of the formed surfaces, formed sheets on which a transferring process was carried out uniformly over the entire surface without air trapping and transfer defects were obtained. Moreover, when the filling rate of the resin was measured at 10 points within the imprinting surface by using a scanning electron microscope, an average value of 93% was obtained.

Example 3

(1) Size of imprint mold: the same as that of example 1.
(2) Material of imprint mold: the same as that of example 1
(3) Fine shapes of texture of imprint mold: the same as that of example 1
(4) Press machine: the same as that of example 1
(5) Temperature adjustments: the same as those of example 1
(6) Sheet-like material: the same as that of example 1
(7) Intermediate base: the same as that of example 1
(8) Installation method of imprint mold: A convex plate having a parabolic surface was placed below the imprint mold, and the non-imprinting surface of the imprint mold was made tightly in contact with the plate to be fixed thereon.
(9) A film whose amount of plastic deformation changes in response to a pressure was pressed, and the thickness of the film after the pressing process was measured at intervals of 10 mm. The measurements were carried out so as to allow lattices, each having 10 mm in one side, to be aligned in the longitudinal direction of the grooves (hereinafter, referred to as a groove longitudinal direction) on the imprint mold imprinting surface at the time of pressing. The imprinting pressure distribution in the longitudinal direction of the grooves was examined so that an imprinting pressure distribution, as shown in FIG. 5 was obtained. That is, a maximum imprinting pressure section is present in the center portion of the imprinting surface, with no minimum imprinting pressure section being present within the imprinting surface, and the amount of reduction in the imprinting pressure along the imprinting pressure gradient is monotonically increased.
(10) By using the above-mentioned device, a forming process was carried out under the same processing conditions as those of example 1.

The above-mentioned operation was repeated so that 10 sheets of formed sheets were obtained. As a result of visual evaluations of the formed surfaces, formed sheets on which the fine shapes of texture were transferred on the entire surface uniformly, without air trapping and transfer defects, were obtained. Moreover, when the filling rate of the resin was measured at 10 points within the imprinting surface by using a scanning electron microscope, an average value of 98% was obtained.

Example 4

(1) Size of imprint mold: the same as that of example 1.
(2) Material of imprint mold: the same as that of example 1
(3) Fine shapes of texture of imprint mold: An imprint mold having grooves that are arranged in a stripe pattern, each having a pitch of 25 µm and a height of convex portion of 12.5 µm, and an isosceles right triangle in its cross section, when viewed in the travelling direction of the sheet, was used.
(4) Press machine: the same as that of example 1
(5) Temperature adjustments: the same as those of example 1
(6) Sheet-like material: made from polyethylene terephthalate, with a thickness of 100 µm and a width of 520 mm.
(7) Intermediate base: A laminated sheet, formed by joining fluoro resin onto ethylene propylene rubber having a thickness of 5 mm, was pasted to an upper side pressing plate. At this time, the fluoro resin was superposed in such an order as to be made in contact with the sheet material.
(8) Installation method of imprint mold: the same as that of example 3.
(9) A film whose amount of plastic deformation changes in response to a pressure was pressed, and the thickness of the film after the pressing process was measured at intervals of 10 mm. The measurements were carried out so as to allow lattices, each having 10 mm in one side, to be aligned in the longitudinal direction of the grooves (hereinafter, referred to as a groove longitudinal direction) on the imprint mold imprinting surface at the time of pressing. The imprinting pressure distribution in the longitudinal direction of the grooves was examined so that an imprinting pressure distribution, as shown in FIG. 5, was obtained. That is, a maximum imprinting pressure section is present in the center portion of the imprinting, surface, with no minimum imprinting pressure section being present within the imprinting surface, and the amount of reduction in the imprinting pressure along the imprinting pressure gradient is monotonically increased.
(10) By using the above-mentioned device, a forming process was carried out under the same processing conditions as those of example 1.

The above-mentioned operation was repeated so that 10 sheets of formed sheets were obtained. As a result of visual evaluations of the formed surfaces, formed sheets on which a transferring process was carried out over the entire surface uniformly, without air trapping and transfer defects, were obtained, and when the fine shapes of texture thus formed were observed by using a scanning electron microscope, a stripe pattern in the form of an isosceles right triangle was formed on the imprint mold side, and a random concave/convex pattern was formed on the intermediate base side. When the filling rate of the resin was measured at 10 points within the imprinting surface, an average value of 98% was obtained.

Example 5

(1) Size of imprint mold: the same as that of example 1
(2) Material of imprint mold: the same as that of example 1
(3) Fine shapes of texture of imprint mold: the same as that of example 4
(4) Press machine: the same as that of example 1
(5) Temperature adjustments: the same as those of example 1
(6) Sheet-like material: the same as that of example 1
(7) Intermediate base: A cushioning member, formed by impregnating a heat resistant nylon textile having a thickness of 2 mm with fluoro rubber, and a smoothed film made of fluoro resin (FEP) having a thickness of 200 μm were laminated to each other, and this was pasted to an upper side pressing plate. At this time, the smoothed film was superposed in such an order as to be made in contact with the sheet-like material.
(8) Installation method of imprint mold: the same as that of example 1
(9) A film whose amount of plastic deformation changes in response to a pressure was pressed, and the thickness of the film after the pressing process was measured at intervals of 10 mm. The measurements were carried out so as to allow lattices, each having 10 mm in one side, to be aligned in the longitudinal direction of the grooves (hereinafter, referred to as a groove longitudinal direction) on the imprint mold imprinting surface at the time of pressing. The imprinting pressure distribution in the longitudinal direction of the grooves was examined so that an imprinting pressure distribution, as shown in FIG. 15(b), was obtained. That is, a maximum imprinting pressure section is present in the center portion of the imprinting surface, with no minimum imprinting pressure section being present within the imprinting surface, and the amount of reduction in the imprinting pressure along the imprinting pressure gradient is monotonically increased.
(10) By using the above-mentioned device, a forming process was carried out under the same processing conditions as those of example 1.

The above-mentioned operation was repeated so that 10 sheets of formed sheets in which the fine shapes of texture were imprinted on the imprint mold side of the sheet-like material were obtained. As a result of visual evaluations of the formed surfaces, formed sheets on which a transferring process was carried out on the entire surface uniformly, without air trapping and transfer defects, were obtained. Moreover, when the formed fine shapes of texture was observed by using a scanning electron microscope, a stripe pattern in the form of an isosceles right triangle was formed on each of the two surfaces. When the filling rate of the resin was measured at 10 points within the imprinting surface, an average value of 98% was obtained.

Example 6

(1) Size of imprint mold: the same as that of example 1
(2) Material of imprint mold: the same as that of example 1
(3) Fine shapes of texture of imprint mold: An imprint mold, which had grooves arranged in a stripe pattern, each having a pitch of 10 μm and a height of convex portion of 5 μm and a shape of an isosceles right triangle in its cross section, when viewed in the travelling direction of the sheet, was used.
(4) Press machine: the same as that of example 1
(5) Temperature adjustments: A temperature-adjusting heat medium passage was formed in the imprint mold, and the heating process was carried out with water at a temperature of 140° C. and the cooling process was carried out with water at a temperature of 60° C.
(6) Sheet-like material: the same as that of example 1
(7) Intermediate base: A cushioning member, formed by impregnating a heat resistant nylon textile having a thickness of 2 mm with fluoro rubber, was subjected to a shot blasting treatment on its surface on the sheet-like material side so as to have a random concave/convex shape. The average depth of the concave/convex shape was about 10 μm, and the distance between the adjacent convex portions had an average value of about 20 μm.
(8) Installation method of imprint mold: the same as that of example 3
(9) A film whose amount of plastic deformation changes in response to a pressure was pressed, and the thickness of the film after the pressing process was measured at intervals of 10 mm. The measurements were carried out so as to allow lattices, each having 10 mm in one side, to be aligned in the longitudinal direction of the grooves (hereinafter, referred to as a groove longitudinal direction) on the imprint mold imprinting surface at the time of pressing. The imprinting pressure distribution in the longitudinal direction of the grooves was examined so that an imprinting pressure distribution, as shown in FIG. 5, was obtained. That is, a maximum imprinting pressure section is present in the center portion of the imprinting surface, with no minimum imprinting pressure section being present within the imprinting surface, and the amount of reduction in the imprinting pressure along the imprinting pressure gradient is monotonically increased.
(10) By using the above-mentioned device, a forming process was carried out in the following manner.

Preliminarily, a sheet-like material was put on an imprint mold. Next, temperature-adjusting water was allowed to flow through the imprint mold so that the imprint mold was heated up to a temperature of 120° C., and an upper side pressing plate to which an intermediate base had been attached was then lowered so that the pressing process of the sheet-like material was started. The pressing pressure was raised up to 2250 kN in seven seconds, and after the completion of the pressure rise, the pressed state was maintained for 3 seconds. The temperature-adjusting water flow was stopped during the pressing process. Thereafter, with the pressing process being continued, cooling water was allowed to flow through the imprint mold, and the cooling process was stopped when the temperature of the imprint mold had become 90° C., and the press was opened. Thereafter, the sheet was released from the imprint mold.

The above-mentioned operation was repeated so that 10 sheets of formed sheets on which the fine shapes of texture were imprinted on each of the two surfaces of the sheet-like material were obtained. As a result of visual evaluations of the formed surfaces, formed sheets on which a transferring process was carried out on the entire surface uniformly, without air trapping and transfer defects, were obtained. Moreover, when the formed fine shapes of texture were observed by using a scanning electron microscope, a stripe pattern in the form of an isosceles right triangle was formed on the imprint mold side, with a random concave/convex pattern being formed on the intermediate base side. When the filling rate of the resin was measured at 10 points within the imprinting surface, an average value of 98% was obtained. In this case, "filling rate" refers to the same means as in example 1.

Example 7

(1) Size of imprint mold: the same as that of example 1
(2) Material of imprint mold: the same as that of example 1
(3) Fine shapes of texture of imprint mold: the same as that of example 6
(4) Press machine: the same as that of example 1
(5) Temperature adjustments: the same as those of example 6
(6) Sheet-like material: the same as that of example 1
(7) Intermediate base: A cushioning member, formed by impregnating a heat resistant nylon textile having a thickness of 2 mm with fluoro rubber, and a transfer sheet having a thickness of 0.2 mm, made from polyethylene terephthalate, were laminated to each other. In this case, the fine shapes of texture of the transfer sheet was prepared as grooves formed into a stripe pattern, each having a pitch of 10 μm, a height of convex portion of 5 μm and a shape of an isosceles right triangle in its cross section, when viewed in the travelling direction of the sheet. A shape in which a desired imprinting shape was inverted was preliminarily formed on a mold, and after heating this mold, a polyethylene terephthalate resin serving as a material for the transfer sheet was pressed onto the mold so that the transfer sheet was prepared.
(8) Installation method of imprint mold: the same as that of example 3
(9) A film whose amount of plastic deformation changes in response to a pressure was pressed, and the thickness of the film after the pressing process was measured at intervals of 10 mm. The measurements were carried out so as to allow lattices, each having 10 mm in one side, to be aligned in the longitudinal direction of the grooves (hereinafter, referred to as a groove longitudinal direction) on the imprint mold imprinting surface at the time of pressing. The imprinting pressure distribution in the longitudinal direction of the grooves was examined so that an imprinting pressure distribution, as shown in FIG. 5, was obtained. That is, a maximum imprinting pressure section is present in the center portion of the imprinting surface, with no minimum imprinting pressure section being present within the imprinting surface, and the amount of reduction in the imprinting pressure along the imprinting pressure gradient is monotonically increased.
(10) By using the above-mentioned device, a forming process was carried out under the same processing conditions as those of example 6.

The above-mentioned operation was repeated so that 10 sheets of formed sheets in which the fine shapes of texture were imprinted on each of the two surfaces of the sheet-like material were obtained. As a result of visual evaluations of the formed surfaces, formed sheets on which a transferring process was carried out on the entire surface uniformly, without air trapping and transfer defects, were obtained. Moreover, when the formed fine shapes of texture were observed by using a scanning electron microscope, a stripe pattern in the form of an isosceles right triangle was formed on each of the two surfaces. When the filling rate of the resin was measured at 10 points within the imprinting surface, an average value of 98% was obtained.

Table 1 shows the results of examples 1 to 7. In the imprinting pressure distribution of example 1, it was not possible to sufficiently discharge air in the pressing time of 3 seconds; however, in the case when the pressing time was extended to 15 seconds as shown in example 2, air was completely discharged so that a uniform forming process was carried out. This is because since the air discharging rate is lowered at a portion where the amount of change in the imprinting pressure is reduced, more time is required so as to completely discharge air. Moreover, in the imprinting pressure distributions of examples 3 and 4, since the amount of change in the imprinting pressure along the imprinting pressure gradient was monotonically increased, the air discharging rate became higher so that trapped air could be completely discharged even in the pressing time of 3 seconds. Furthermore, in example 5, by using the intermediate base having a cushioning property, air could be discharged by using the same imprinting pressure distribution and forming conditions as those of example 1 even within the pressing time of 3 seconds. In examples 6 and 7, in the structure in which a fine shape is imprinted on each of the two surfaces of the material, by using the intermediate base having a cushioning property, a uniform, forming process was achieved without air trapping, even within the pressing time of 3 seconds.

Comparative Example 1

Figure 16:
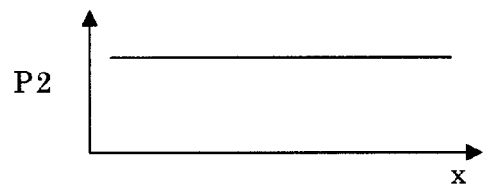
FIG. 16 is a schematic drawing that shows as a schematic model an imprinting pressure distribution of comparative example 1.

By using the same device as that of example 1, the same processes as those of example 1 were carried out under the same conditions as those of example 1, except that the imprint mold was directly put on the lower side pressing plate, with no plate being interposed therebetween, so that 10 sheets of formed sheets were produced; however, forming defects due to air trapping occurred on all the sheets. A film whose amount of plastic deformation changes in response to an applied pressure was pressed. Measurements were carried out so as to allow lattices, each having 10 mm in one side, to be aligned in the longitudinal direction of the grooves (hereinafter, referred to as a groove longitudinal direction) on the imprint mold imprinting surface at the time of pressing. The thickness of the film after the pressing process in the longitudinal direction of the grooves was measured at intervals of 10 mm so that the imprinting pressure distribution was examined; thus, an imprinting pressure distribution, as shown in FIG. 16, was obtained, which showed that no imprinting pressure gradient was present on the imprinting surface at the time of forming. For this reason, trapped air was not removed, and this caused forming defects.

Comparative Example 2

Figure 17:
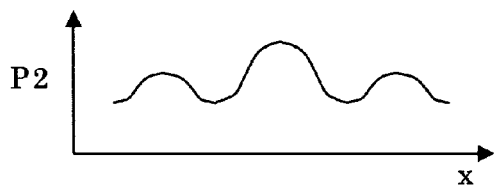
FIG. 17 is a schematic drawing that shows as a schematic model an imprinting pressure distribution of comparative example 2.

The same device as that of example 1 was used, except that the imprint mold, which had a structure in which column shaped rubber members having different heights were placed on the lower side of the outside of the imprinting surface so that the center portion of the imprinting surface was allowed to protrude, and was fixed onto the lower side pressing plate so as to be successively pressed from the center portion of the imprinting surface upon starting the pressing process. By using this device, the same processes as those of example 1 were carried out under the same conditions so that 10 sheets of formed sheets were produced; however, forming defects due to air trapping occurred on all the sheets. A film whose amount of plastic deformation changes in response to an applied pressure was pressed, and the film thickness after the pressing process was measured at intervals of 10 mm. Measurements were carried out so as to allow lattices, each having 10 mm in one side, to be aligned in the longitudinal direction of the grooves (hereinafter, referred to as a groove longitudinal direction) on the imprint mold imprinting surface at the time of pressing. The thickness of the film after the pressing process in the groove longitudinal direction was measured so that an imprinting pressure distribution, as shown in FIG. 17, was obtained, which showed that the pressure had a minimum value at a gap between the rubber members. The trapped air was accumulated at the pressure minimum sections, with the result that forming defects were caused.

TABLE 1

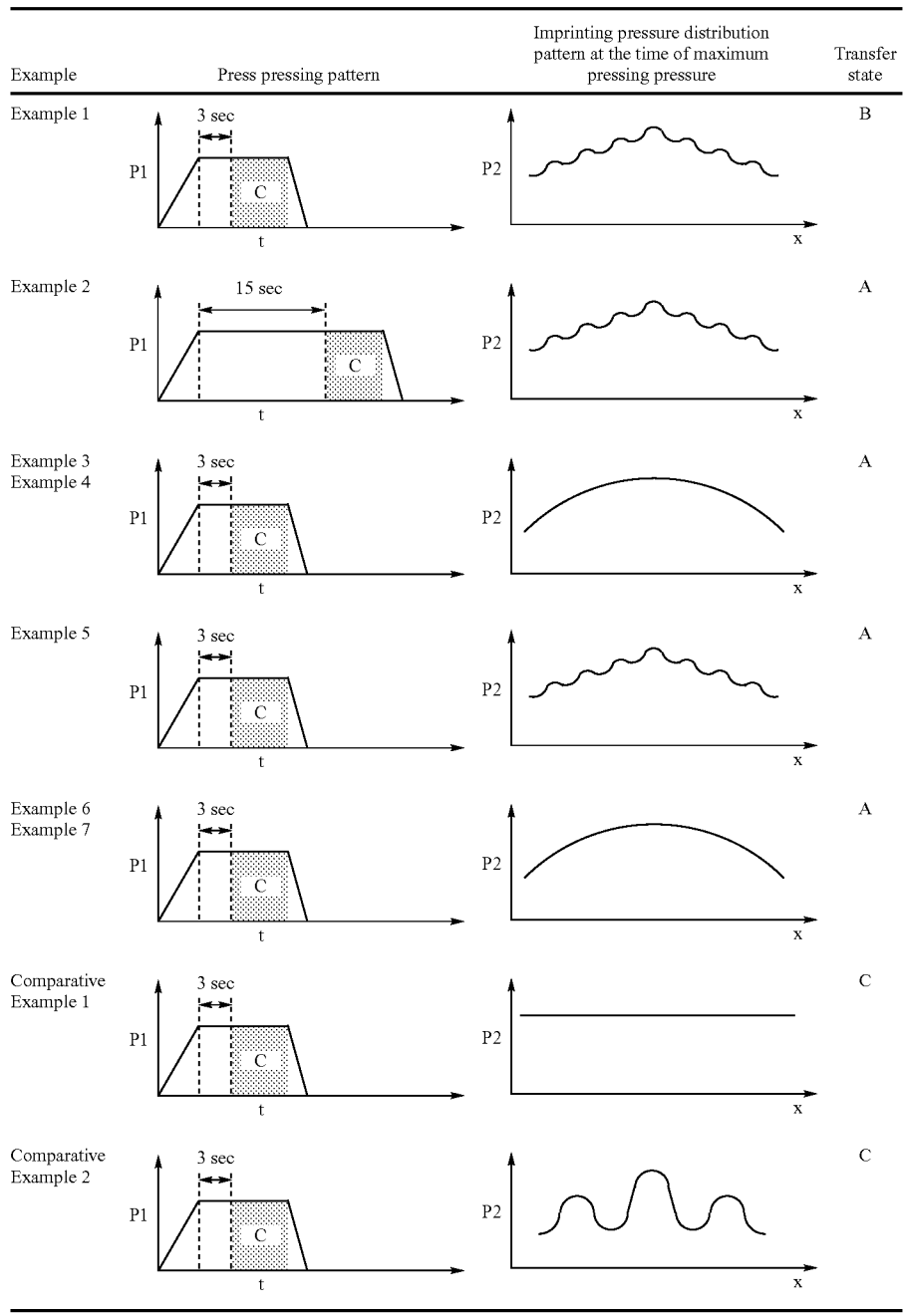

Meanings of symbols in the graph
P1: Press applied pressure
t: Time
C: Cooling
P2: Imprinting pressure
Evaluation of transfer state
A: A uniform forming process was carried out without air trapping defects.
B: A uniform forming process was carried out although air trapping occurred slightly.
C: Air trapping defects occurred, failing to carry out a uniform forming process.

The invention claimed is:
1. A device for manufacturing a sheet having a shape transferred thereon comprising at least:
   an imprint mold having a first imprinting surface having a first texture having convex shapes or concave shapes;
   an intermediate base having a cushioning property and comprising a cushion material that exhibits substantial volume change upon receiving a stress thereon, having a second imprinting surface having a second texture;
   a pair of pressing plates placed so as to sandwich the imprint mold and the intermediate base; and a convex-shaped plate placed on a surface of at least one of the pair of pressing plates on a pressure-applying direction side, wherein the convex shaped plate has a thickness distribution such that there is a pressure distribution having a maximum imprinting pressure section present in the first imprinting surface and a minimum imprinting pressure section not present in the first imprinting surface during operation of the device, wherein the cushion material that exhibits substantial volume change upon receiving a stress thereon comprises a polymer material having pores inside, a composite material having a rubber and a volume-changing layer laminated therein, wherein the volume-changing layer is impregnated with the rubber, wherein the volume-changing layer comprises a knitted material, a textile of fibers, a non-woven cloth, or a laminated material, wherein the intermediate base comprises a laminate comprising a transfer sheet having shapes of texture laminated onto the cushion material.

2. The device for manufacturing a sheet having a shape transferred thereon according to claim 1, wherein the concave shapes of the first texture of the imprint mold comprise a plurality of grooves arranged in parallel with one another, and the convex shaped plate is placed so that a change in thickness of the convex shaped plate is made coincident with a longitudinal direction of the grooves.

3. The device for manufacturing a sheet having a shape transferred thereon according to claim 2, wherein an absolute value of an amount of change in thickness per unit length of the convex shaped plate is monotonically increased along a gradient in thickness from the maximum imprinting pressure section.

4. The device for manufacturing a sheet having a shape transferred thereon according to claim 1, wherein the transfer sheet does not interfere with the cushioning property of the cushion material.

5. The device for manufacturing a sheet having a shape transferred thereon according to claim 1, the transfer sheet comprises a flexible material.

6. The device for manufacturing a sheet having a shape transferred thereon according to claim 1, wherein the cushion material and the transfer sheet are different members having different properties such that the device is configured to create a imprinting pressure distribution and shapes of texture.

* * * * *